Feb. 2, 1943.   R. J. HARRINGTON ET AL   2,309,645
SALES REGISTER
Filed Aug. 21, 1940   4 Sheets-Sheet 2

INVENTORS
RONALD J. HARRINGTON
FRANKLIN P. SHEARER
BY
ATTORNEY

Patented Feb. 2, 1943

2,309,645

UNITED STATES PATENT OFFICE

2,309,645

SALES REGISTER

Ronald J. Harrington, Brooklyn, and Franklin P. Shearer, Queens Village, N. Y.

Application August 21, 1940, Serial No. 353,482

20 Claims. (Cl. 101—212)

The present invention relates to a sales register and, more particularly, to a printing device adapted to cooperate with a conventional cash register for impressing upon sales checks data peculiar to a particular transaction, and especially for positively printing upon a sales check information personal to an individual charge customer during the normal operation of a cash register.

Heretofore, where it was desired to include, upon a sales check or slip, the name, address and account number of a customer, it was necessary for the clerk manually to write out such data, tear the check from his book, and insert the same in the cash register to get certification thereof. As will be readily understood, this method was wasteful of time and effort and, furthermore, was subject to the chance of inaccuracy occasioned by the carelessness or illegible chirography of the clerk.

Mechanical devices for printing this information relative to the customer were later developed, but, although they had the advantage of eliminating inaccuracies due to the human equation, there were attendant disadvantages which considerably limited their employment. Thus, the prior art provided a printing device apart from the cash register, and usually manually operated, for printing a charge customer's name and address upon a sales check. The customer carried a printing plate whereon the type provided the necessary information, and this plate was presented to the sales clerk at the time that a purchase was made and charged.

The printing devices employed not only required an additional separate and independent manipulation, but they had certain mechanical drawbacks. One particularly disadvantageous feature was the number of individual operations required by the clerk in using these devices, and especially was this so where it was desired to print two impressions upon a single sales check. Thus, in U. S. Patent No. 1,801,592 to Dugdale, the printing platform was hinged to the upper part of his machine, thus forcing the operator to turn the upper part over in order to insert the plate into the printing platform; the machine then had to be lowered back into position, and a print was thereafter made by pushing down upon a plunger; next, the machine was again raised, the sales check pulled forward, the machine relowered, and the plunger pushed down again; and finally, the sales clerk was compelled to turn the machine over to the right again before he could remove the type plate. In his U. S. Patent No. 1,852,645, Dugdale described a similar device which also required a large number of operations and which necessitated the sales clerk going through eleven separate and distinct operations before the sales check was addressed.

Moreover, the printing devices in most general use provided a roller which was rolled and either pushed or dragged across the type or printing plate to make the impression upon the check. This sort of impression was unsatisfactory because of the wiping effect, which often left a smear. A different kind of printing mechanism employed two slides which slid over the surface of the type or printing plate, and this also had the effect of wiping an impression upon the sales check. For any printing device of this sort, the printing plate must be in perfect condition, or a legible copy cannot be made.

Since perfect condition of the printing plate was a requisite with the prior art devices, a printing plate of sufficient strength to withstand bending and distortion from any ordinary use had to be provided. However, the printing plates could not be made of heavy construction, as the customer would refuse to carry a heavy plate. Although various structural features, such as rimmed edges and the like, were provided for the purpose of strengthening the prior art printing plates, none was found to be really satisfactory in this respect. Therefore, under the circumstances, the printing devices provided by the prior art had the further handicap of providing partly illegible copies, as the printing plate often got bent and the rollers hit only the high spots thereon. An attempt was made to remedy this situation by providing a machine in which the printing platform was raised and fitted into a recess provided in the printing plate. The platform was mounted upon a spring and was supposed to find its own level when the printing plate was bent out of shape, but this was very unsatisfactory in actual operation and, indeed, often provided variable pressure upon a straight plate.

It will be appreciated from the foregoing that various devices were suggested and attempted by the prior art for mechanically printing data personal to each customer upon the sales check, but none of these suggestions and attempts, so far as we are aware, proved to be wholly satisfactory when applied industrially and commercially. We have found that these prior art handicaps and disadvantages in printing such information can be easily overcome.

It is an object of the present invention to provide a printing device for use in cooperation with cash registers which will surmount the difficulties and drawbacks of the prior art.

It is another object of this invention to provide a printing device which can be used in cooperation with a cash register either as a built-in feature, as an attachment or as a separate unit, either motor or hand driven.

It is a further object of the invention to provide a sales register comprising a cash register combined with a printing device for printing sales checks having impressed thereon data personal to a particular customer.

It is also an object of the present invention to provide a printing device for attachment to cash registers and adapted to print upon sales checks during the operation of the cash register machine any required information from individual type plates whereby each sales check can carry data personal to a particular customer.

The invention also contemplates the incorporation in sales registers of a printing device adapted for printing upon a sales check a customer's name, address, account number, credit rating and/or other required information at the same time and in the same operation that the ordinary functions of a cash register, such as certification and recording of amount, classification, sales number, grand total, etc., are performed.

It is also within the contemplation of the invention to incorporate, in sales registers having attached thereto a printing device adapted for transmitting the impression of type upon a printing plate to a sales check or slip, means for advancing said sales check or slip in the sales register and for operating the printing device at any point or plurality of points during such advance whereby data upon the printing plate can be printed at a plurality of places upon said check or slip without the necessity of manually shifting the position of said check or slip after each printing.

Our invention also provides in combination with a cash register a printing device for transmitting a visible impression upon sales checks from a printing plate associated therewith and bearing information peculiar to a particular transaction, said printing device being adapted for transmitting the impression by means of a rocking pressure upon the printing plate by a platen holding the sales check therebetween, whereby a uniform, non-sliding contact between the printing plate and the sales check is provided, thereby avoiding wiping and smearing.

Moreover, the invention has in view the contribution of a printing device for use with a cash register and having a floating printing platen therein adapted for descending upon sales checks to hold the same in fixed and non-sliding position upon a type plate while rocking back and forth thereover in an unguided path to produce a clear and legible impression without blurs and smears.

Another object of our invention is to provide a printing device having an arcuate platen adapted to produce a rocking contact with sets of sales checks held between said arcuate platen and a printing plate associated therewith whereby a visible impression can be made upon the sales checks with substantially no moving or sliding of the sales check during the making of the impression.

Furthermore, this invention provides a printing device which is adapted to maintain a substantially constant and self-equalizing printing pressure whereby uniformly clear and legible impressions can be produced without adjustment of the device.

The invention further purposes to incorporate in a printing device a variable-position platen and means for accommodating the position of said platen to the shape of the type plate whereby substantially constant pressure between platen and type plate can be provided even where the type plate has been bent or distorted from its original shape.

Still another object of our invention is to provide in a printing device a platen resiliently actuated at substantially constant pressure against a type plate.

It is also an object of the invention to incorporate in sales registers a printing device having a solid printing platform, thereby eliminating any tipping motion during printing whereby a non-uniform impression, heavy in one place and light in another, can be successfully avoided.

This invention has the additional purpose of providing a printing plate for use in sales registers, said printing plate comprising a strong base adapted for insertion therein of a light type plate, thereby providing an inexpensive printing plate for positive printing whereby a new type plate can be substituted in the base without discarding the entire printing plate.

Moreover, our invention provides a printing device for attachment to a cash register which is relatively inexpensive to make and which can be automatically operated with the cash register with great simplicity and a minimum of manual operations.

Other objects and advantages of the present invention will be apparent from the following description of a preferred embodiment, taken in conjunction with the accompanying drawings, in which:

Broadly stated, the present invention provides a printing device for imprinting upon sales checks data peculiar to each particular transaction recorded. As will be understood, the device is particularly adaptable for use with charge accounts, where it is necessary to associate with the particular transaction the name, address and account number, as well as other pertinent details, such as the credit rating, of the individual customer involved. For most efficient operation, our printing device may be attached to a cash register and may be actuated by the cash register mechanism, e. g., by the conventional counter reel mechanism. In this manner, the printing device may be automatically actuated, either for a single or for multiple printings, by operating the cash register in the usual manner. We have provided entirely novel means for obtaining clear, legible sales checks containing such personal information with respect to the customer.

The customer is required to carry a printing plate comprising a strong base or casing in which there is inserted a light type plate bearing the customer's name and other pertinent information. Our novel printing device is provided with a printing platform which is adapted to hold our new printing plate in fixed but releasable position. A feature of the invention is a curvilinear or arcuate platen which is adapted to rock to and fro across the type of the printing plate, and means are provided to keep the platen under substantially constant pressure during the full course of its rocking motion. Reels or spools of typewriter or carbon ribbon or other printing medium are furnished, the ribbon passing between the platen and the printing platform, and means for advancing the ribbon and for changing its direction of travel are also provided.

A very firm and positive contact is made between the platen and the type plate in our present invention, and clear and legible copies are made upon the sale checks therebetween. Even where the printing plate has become bent or distorted, the constant pressure feature in accordance with the principles of our invention permits the issuance of uniform copies. The platen presses upon the printing plate with sufficient force to prevent any movement of the sales checks during the operation of our device, and said platen is adapted to be withdrawn at the end of each printing to allow the set of sales checks to issue from the register.

Figure 1:
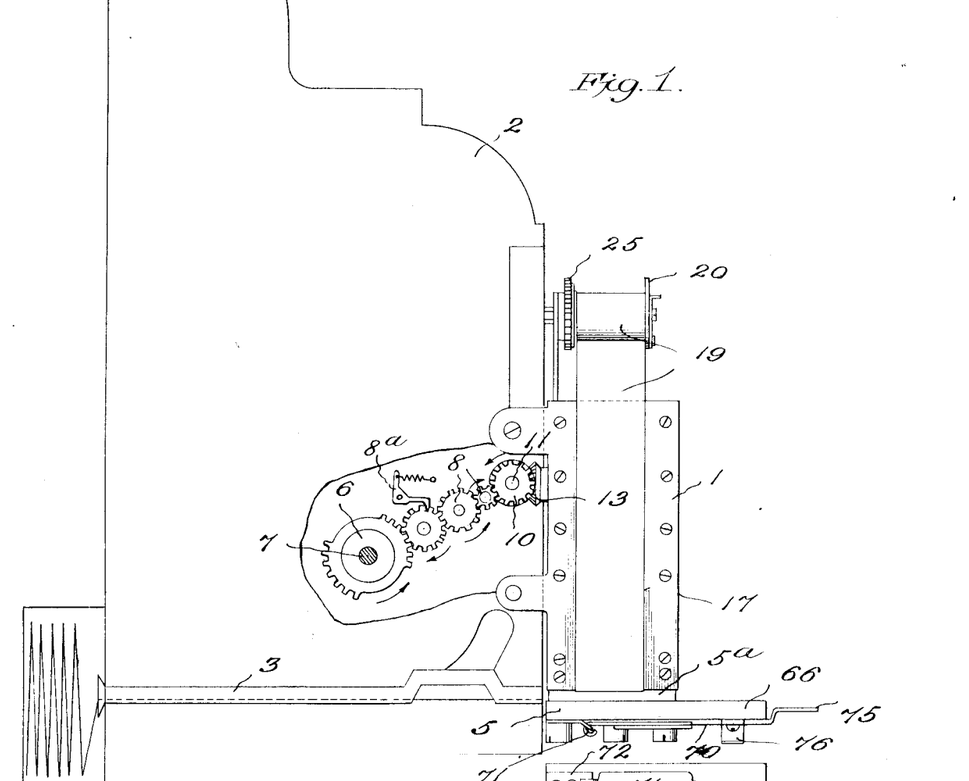
Fig. 1 illustrates an end elevational view of a cash register with an embodiment of our invention attached thereto, the casing of the cash register being partly broken away to reveal normally covered parts.
Figure 2:
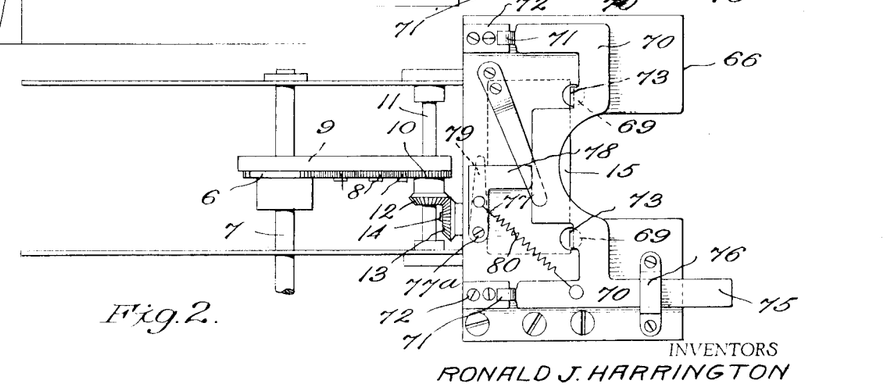
Fig. 2 depicts a fragmentary bottom plan view of the cash register and attached printing device looking upwardly in Fig. 1.

For purposes of illustration, the present invention will be described herein with reference to an embodiment adapted for use in connection with a class 8000 cash register, manufactured by the Ohmer Register Company, of Dayton, Ohio, although it will, of course, be appreciated that the present invention has equal applicability and suitability to all standard forms of cash registers. Referring now more particularly to Figs. 1 and 2, it will be seen that our novel printing device, designated generally by reference numeral 1, is attached by suitable means to the front of a cash register 2 adjacent to the left side thereof. As those skilled in the art know, cash registers of the foregoing type are provided adjacent to the left end with a counter reel assembly (not shown in detail) and a sales check chute designated by numeral 3. The sales check can be handled in either of two ways: it may be inserted into the chute 3 from the side, or it may be fed through chute 3 from a supply in a compartment 4 at the rear of the cash register. The printing device 1 is preferably so disposed that a printing platform 5 thereof is substantially on the same level as the chute 4 so that a sales check ejected from the cash register passes over the platform 5.

In order to link up the printing device 1 with the cash register 2, a mutilated gear 6 is fixedly mounted on main shaft 7 of the cash register. In normal use of the register, shaft 7 makes one complete rotation during each operating cycle. Gear 6 is designed intermittently to operate the printing device twice during each operation of the cash register, for a purpose to be described hereinafter, through a gear train including idler gears 8 rotatably mounted upon a bar 9, a gear 10 secured to a cross shaft 11, and a bevel gear 12 also fixed on shaft 11. Bevel gear 12 engages with a bevel gear 13 mounted upon a drive shaft 14 of our printing device. A dog 8a rides on one of the idler gears 8 to insure proper meshing of the mutilated gear with the first gear of the gear train.

The general construction of our novel device, as may be seen from Figs. 1, 2, 3 and 5, comprises a fixed printing platform 5 adapted removably to hold a printing plate 15 provided with type 16, a mechanism indicated generally by numeral 17 for furnishing printing pressure located above the printing platform 5, and means indicated generally by numeral 18 for supplying a printing medium for the printing operation.

Figures 3, 4:
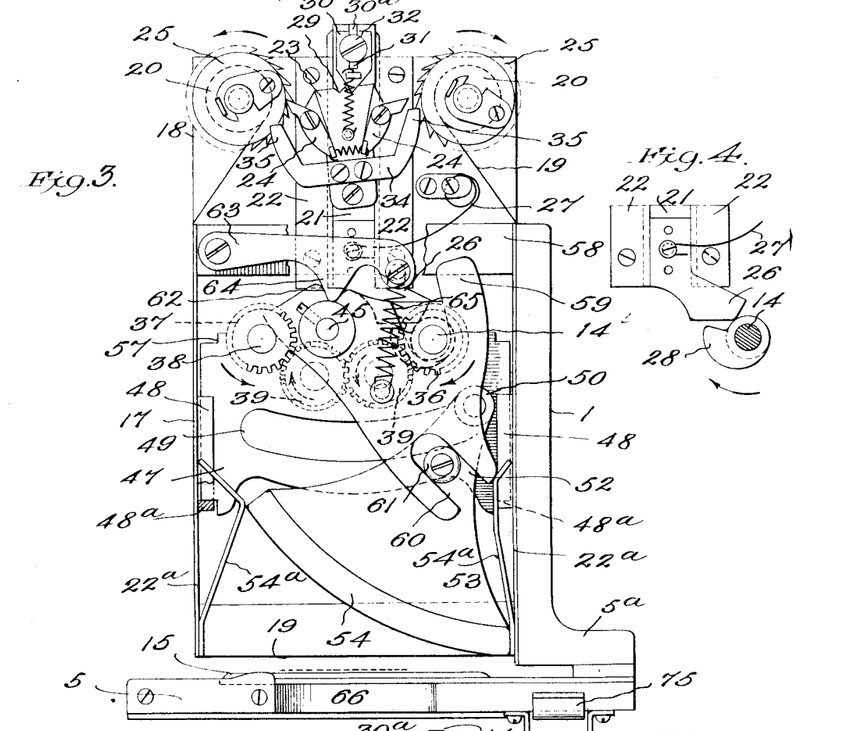
Fig. 3 is a front elevational view of our printing device with the face plate removed therefrom, and showing the parts in the position they occupy at the start of a cycle of operations.
Fig. 4 shows a detail of a portion of the ribbon-advancing mechanism.
Figure 5:
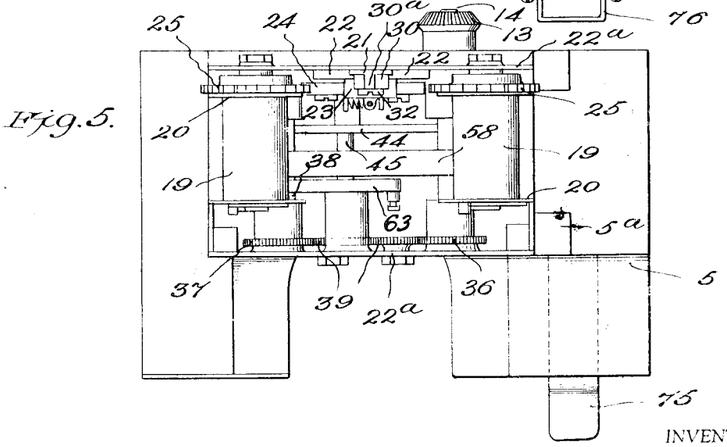
Fig. 5 illustrates a top plan view of the present invention.

The means 18 for supplying a printing medium advantageously comprises a flexible tape 19 carrying a suitable printing medium, e. g., a typewriter ribbon or similar ink or carbon ribbon, for furnishing a legible impression of the type surface 16. The tape or ribbon 19 is mounted upon spools or reels 20 in conventional manner and passes down around the mechanism 17, as may be seen from Fig. 1. While any conventional means for moving the ribbon can be employed, we prefer to use for this purpose an automatic step-by-step advancing and self-reversing mechanism, such as is shown in Fig. 3, comprising a slide 21 mounted for vertical reciprocation between two grooved bars 22 secured to the framework 22a of our device. A tumbler 23 carrying a spring-controlled, ribbon-advancing pawl 24 at each side thereof is pivoted near its lower end to the slide 21. The pawls 24 are adapted selectively to engage with ratchets 25 on the ribbon spools 20 as the tumbler 23 is tilted to either one side or the other. Secured to the lower end of the slide 21 is a tappet 26 resiliently urged by a spring 27 into contact with a cam 28 mounted upon the drive shaft 14 of our printing device.

The tumbler 23 is yieldingly held in selected position by providing its upper surface with two adjacent notches 29 into either of which the V-shaped lower end of a vertically movable pawl 30 is adapted to engage. Pawl 30 is provided with a slot 31 having sliding engagement with a vertical guide 30a on the slide 21 to which it is secured by a cap screw 32 passing through slot 31, as may be seen in Fig. 5, thus permitting vertical movement of the pawl but preventing horizontal displacement thereof. A tension spring 33 resiliently urges pawl 30 downwardly into one or the other of notches 29. To provide for automatic reversal of the ribbon advancing mechanism, a U-shaped lever 34 is rigidly fixed at its bight to the lower part of tumbler 23 in such manner that its upwardly extending arm 35 on the side toward which tumbler 23 is tilted extends beyond the periphery of the adjacent spool 20. As the spool fills, the ribbon 19 gradually engages and pushes the arm 35 toward the other side. This motion is transmitted to the tumbler 23, causing pawl 30 to be pushed upwardly by cam action until its lower end passes the bridge between the two notches 29 whereupon spring 33 snaps the pawl 30 into the other notch 29, thus tilting tumbler 23 and associated parts to the opposite position.

The mechanism 17 for producing the necessary printing pressure is mounted in the framework 22a, which may comprise front, back and end walls. Referring now to Figs. 3, 6, 7, 8 and 11, it will be seen that the drive shaft 14 is rotatably mounted in the front and rear walls of framework 22a, adjacent to one end wall. A gear 36 fixed to the shaft 14, preferably in proximity to the front wall, is adapted to drive gear 37, mounted upon a shaft 38, which is journaled in the framework 22a parallel to and at the level of shaft 14 and adjacent to the other end wall. Gear 36 drives gear 37 through the medium of two idler gears 39 which are preferably mounted on the front wall of framework 22a.

Two enantiomorphic cams 40 and 41 are fixedly mounted on shafts 14 and 38, respectively, near the rear wall of framework 22a and are adapted to engage rollers 42 and 43, respectively, which are secured to the back of a driving plate 44. The driving plate 44 is mounted for oscillation upon a shaft 45 which is journaled in the front and rear walls of the framework 22a between shafts 14 and 38. Deep indentations, forming lobes upon which rollers 42 and 43 are mounted, are provided in the upper portion of the driving plate 44 to provide clearance for shafts 14 and 38 as the plate oscillates, and, at the lower end, plate 44 is narrowed and provided with a slot 46 (see especially Fig. 7).

Figures 7, 9, 10:
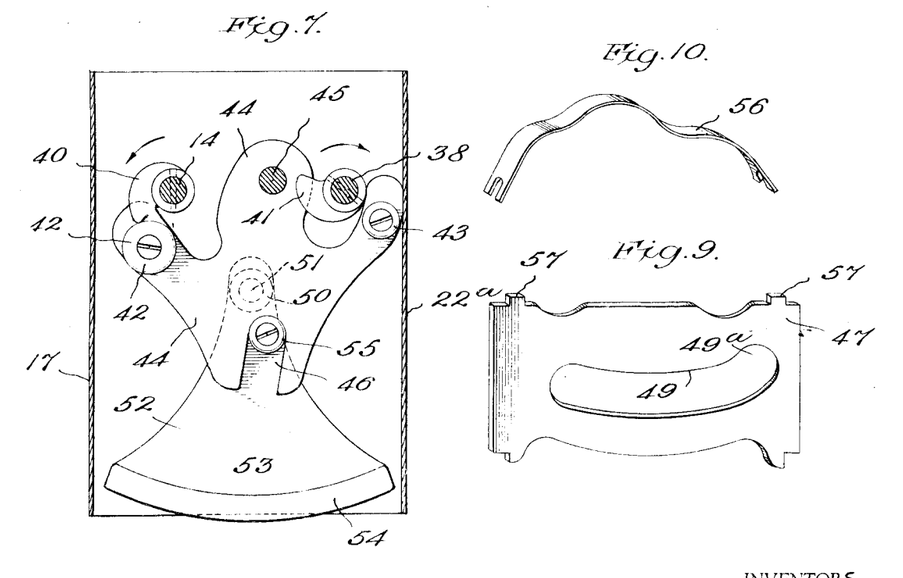
Fig. 7 depicts a fragmentary rear elevational view of our printing device, with certain parts omitted and showing the remaining parts in substantially the same relative position as Fig. 6.
Figs. 9 and 10 are perspective views, respectively, of a printing platen control plate and a spring for use therewith.

A control plate 47 is movably mounted between the end walls of framework 22a by vertical guides 48 and extends transversely below shafts 14, 38 and 45. The control plate 47, the construction of which is best seen in Fig. 9, is provided with a cam or guide surface which may take the form of an elongated arcuate slot 49 having an upwardly offset recess 49a at that end of the slot near the driving shaft 14. A roller 50, having a diameter almost equal to the width of slot 49 and being slightly thicker than control plate 47, is rotatably mounted upon an axis 51 in the slot 49 between two supporting arms 52 of a printing platen 53. The printing platen has an arcuate presser plate 54 at the lower ends of the supporting arms (see also Fig. 12), and end plates 54a bent in suitable form are attached to the inner side walls of the framework 22a to position said presser plate movably between them. The contour of the guide surface formed by slot 49 depends upon the location of axis 51 with respect to the center of the circle of which the presser plate 54 is an arc. If axis 51 were at the center, the guide surface would be straight, except at the offset recess 49a, in order to provide substantially uniform pressure against the type 16. For the same reason, where axis 51 is closer to the arcuate plate 54 than its center, slot 49 will bow downwardly a corresponding amount, as illustrated in the drawings. A roller 55 is rotatably mounted on the rear arm 52 of the platen 53 and is adapted to fit snugly into slot 46 of the driving plate 44.

The control plate 47 is resiliently urged toward a stop 48a at the bottom of the grooves formed by guides 48 by a leaf spring 56 (see especially Fig. 10) having bifurcated ends engaging two lugs 57 at the top of the control plate 47 and its bight pressing against a horizontal bar 58 above the spring.

Figure 6:
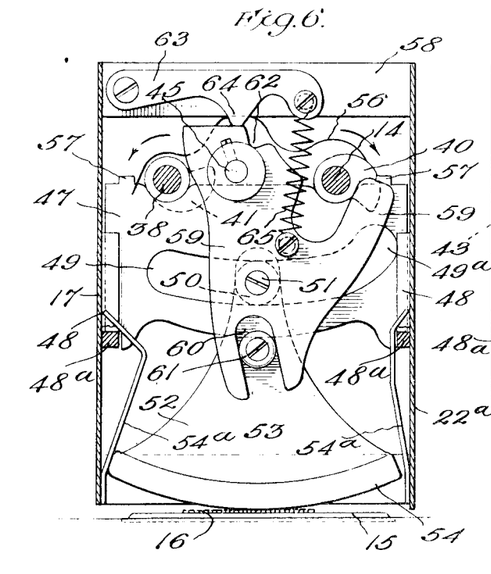
Fig. 6 is a fragmentary view similar to Fig. 3 with certain parts omitted for clarity and showing the remaining parts in the position they occupy shortly after being moved from starting position.
Figures 11, 12, 13:
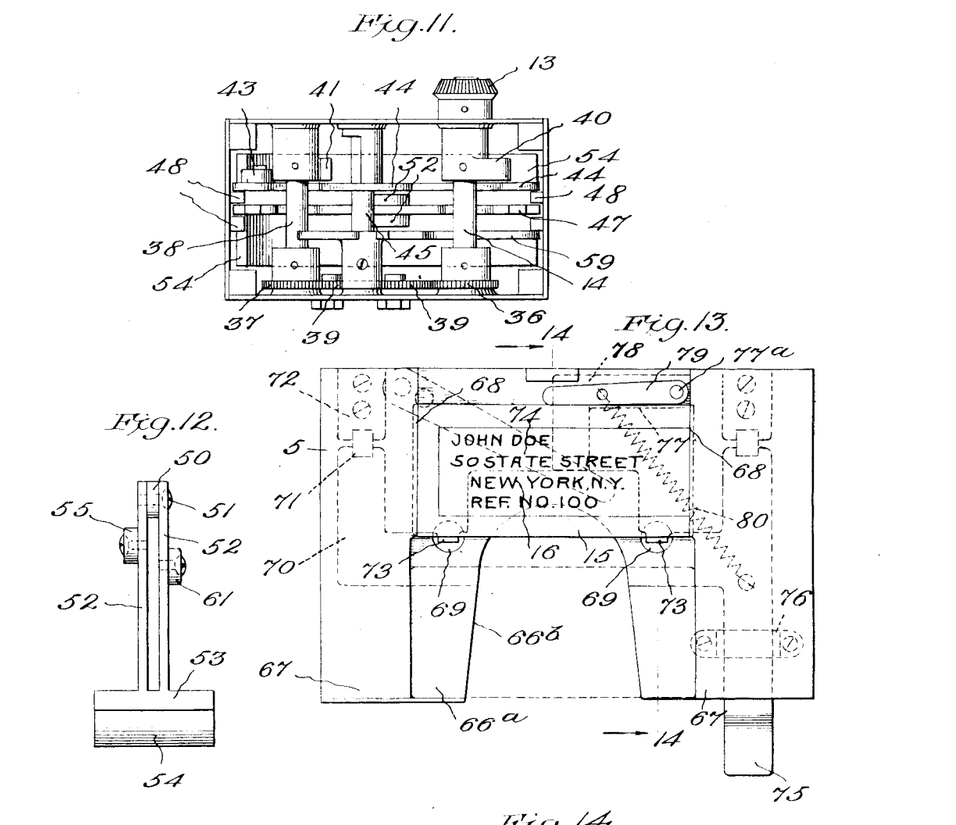
Fig. 11 is a top plan view of the operating mechanism of our improved printing device with the ribbon and ribbon mechanism removed therefrom.
Fig. 12 shows an end elevational view of the printing platen of our invention.
Fig. 13 illustrates a top plan view of the printing platform of our novel device.

A follow-up plate 59, seen in Figs. 3, 6 and 11, is mounted for oscillation upon shaft 45 at a position in front of the front arm 52 of the platen 53. The follow-up plate 59 is narrowed and bifurcated at its lower end, forming a slot 60 in which a roller 61 rotatably mounted upon the front arm 52 of the platen 53 is slidable. The upper portion of the follow-up plate 59 is deeply indented to provide clearance for shaft 14 and is also provided with a V-shaped notch 62. A dog 63, pivoted at one end to the bar 58, has a nib 64 adapted to engage in notch 62 or to ride upon the top of the follow-up plate, depending upon the angular position of the follow-up plate. The dog 63 and the follow-up plate 59 are resiliently urged into constant engagement by a tension spring 65.

Figures 14, 15:
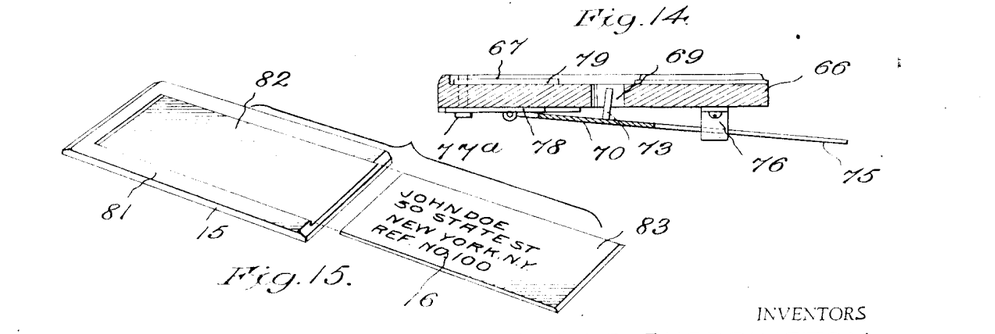
Fig. 14 depicts a sectional view of said printing platform, taken on the line 14—14 of Fig. 13.
Fig. 15 is an exploded perspective view of a base and type plate comprising our novel printing plate.

The printing platform 5 is fixedly secured by a strut 5a to the framework 22a below and spaced from the mechanism 17 (see Figs. 1 and 3). As shown in Figs. 1, 2, 13 and 14, the platform 5 comprises a table 66 located directly beneath the printing platen 53 and extending forward therefrom to form a shelf 66a, preferably partly cut away centrally to provide a thumb slot 66b at the front thereof. The top surface of table 66 is recessed centrally from the front toward the rear, leaving two side guides 67 defining a groove between them about equal to the length of the printing plate 15. The side guides 67 are preferably provided, at the edges facing each other, with inwardly-slanted bevels adjacent to their rear ends to form a dovetail groove 68 into which the printing plate 15 may be slipped from the front. Means are provided removably to latch the printing plate in operative position comprising two perforations 69 at the front of groove 68, and a lever bar 70 pivoted beneath the base by means of hinges 71 attached to hinge plates 72 on either side of the base. The lever bar is provided with two studs 73 which are so located thereon as to be adapted to pass upward through the perforations 69 and engage the front edge of the printing plate when the lever bar 70 is in raised position. One end of a leaf spring 74 which is secured at its other end to the bottom of the table 66 resiliently holds the lever 70 in raised position. The lever bar is provided with a key 75, preferably integral therewith, extending beyond the front of table 66. By manually depressing key 75 the studs 73 are lowered out of engagement with the printing plate, as seen in Fig. 14, permitting the same to be readily withdrawn. A strap 76 secured to the under side of table 66 serves to limit the downswing of key 75.

An ejector 77 for the printing plate 15 is preferably provided which may comprise a pin 77a extending vertically through a bore in the table 66 adjacent to the rear edge thereof and to the lower and upper ends of which are non-rotatably secured an elbow 78 and an ejector arm 79, respectively. The ejector arm 79 lies in the groove 68 and is movable into and out of the path of a printing plate 15. A tension spring 80 has its two ends attached, respectively, to the lever bar 70 and the elbow 78. Spring 80 is adapted resiliently to urge the pin 77a and associated parts in a clockwise direction as viewed in Fig. 2, or in a counter-clockwise direction as viewed in Fig. 13. Rotation of these parts is prevented when the lever 70 is in raised position by the engagement of the arm of elbow 78 remote from the pin 77a with a portion of lever 70, but when key 75 is depressed this engagement is broken, permitting elbow 78 to move between lever 70 and table 66, as shown in Fig. 14. At the same time ejector arm 79 forceably ejects the printing plate 15 out of the groove 68 onto the shelf 66a. Elbow 78 keeps lever 70 in depressed position until another printing plate is slipped into the groove 68, causing ejector arm 79 to rotate in a clockwise direction, as viewed in Fig. 13, until the elbow 78 is moved out of contact with lever 70, whereupon leaf spring 74 raises lever 70 to its upper position with the lugs 73 in contact with the front edge of printing plate 15 which is thus removably locked in operative position. The thumb slot 66b facilitates the placing of printing plate 15 on or its removal from shelf 66a.

The printing plate 15, as may be seen in Fig. 15, preferably comprises a frame 81 of metal or other suitable strong material such as transparent plastic, colored or uncolored, or the like, having a dovetailed groove 82 therein into which a type plate 83 may be slidably inserted from one end. The ends of the frame 81 are preferably beveled to correspond to the dovetailed groove 68 in the table 66. Similarly, it is preferred to bevel the side edges of type plate 83 to correspond to the dovetailed groove 82 of the frame 81.

The type plate 83 is preferably made of light, inexpensive metal, and it is preferred to employ raised, positive type 16. The type plate is of sufficient thickness so that its top surface is substantially on a level with the top surface of the frame 81, and the surface of the type 16 is raised sufficiently above the top of the type plate so that a clear, legible impression can be transmitted thereby. The operation of our improved printing device is extremely simple. Upon receiving the printing plate 15 from a customer, the sales clerk slips it into operating position in the groove 68 of table 66 as described hereinabove. The sales clerk then proceeds to register and record the sale on the sales register 2 in a conventional manner. As those skilled in the art know, cash registers of the above-mentioned type automatically record certain information relative to the sale on a sales slip, or set of sales slips, which is then ejected from the chute 3. Our printing device is adapted to record on the same sales slip during the same operation certain information peculiar to the particular customer making the purchase. As soon as this has been done, the sales clerk depresses key 75 to eject the printing plate 15, as described hereinabove, and returns it to the customer with the customer's sales check.

It will be observed that the sales clerk has performed only three simple operations in addition to the operations incident to customary operation of the cash register and that all three of these simple, additional operations can be performed by the sales clerk with one hand, thus enabling him to hold the merchandise in the other hand or arm.

A typical sales check frequently has two parts with a perforation therebetween, one part serving as a memorandum of the sale and the other part being adapted, after detachment from said first part, to serve as a label for the package in which the merchandise is contained. In such case, the data upon the printing plate 15 must be printed upon each part of said sales check, thus requiring the mechanism 17 for furnishing the printing pressure to be actuated twice each time the sales register is operated. The present invention has been described and illustrated in connection with an embodiment thereof wherein the mutilated gear has two sets of teeth so as to make two spaced printings upon a single sales check, but it will be understood that any desired number of printings and any spacing thereof upon the sales check may be obtained simply by providing correct timing and adapter gears and properly spacing the desired number of sets of teeth on the mutilated gear 6, as those skilled in the art will readily understand. The cycle of operations through which the parts driven by the gear 6 go is the same regardless of the number of printings, and accordingly the operation of our printing mechanism will now be described with respect to only a single printing. For this purpose, particular reference will be made to Figs. 3, 6, 7, and 11.

Figure 8:
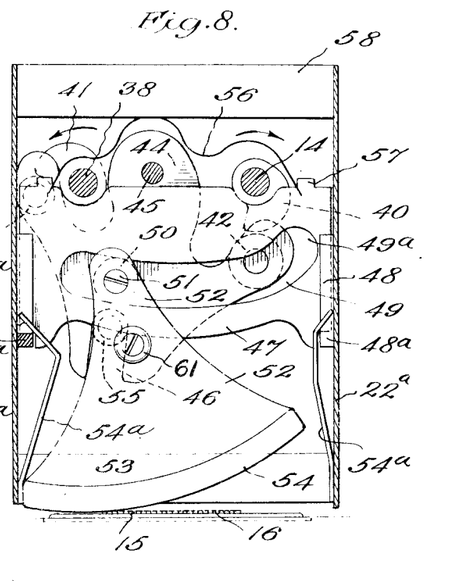
Fig. 8 depicts a front elevational view, similar to Fig. 6, but with further parts removed, and showing the remaining parts in the position they assume near the limit of their motion in one direction.

When the cash register is set in motion as aforesaid, the drive shaft 14 of our printing device is driven in a clockwise direction, as viewed in Figs. 6 and 8, and in turn rotates gear 37 and shaft 38 in a counter-clockwise direction. At the start of the operation of the printing mechanism, cam 40 on shaft 14 engages roller 42 on the driving plate 44 and swings the driving plate 44 about shaft 45 from its farthest position at the right-hand side of our device clockwise toward its extreme position on the left, as viewed from the front. (See Figs. 3, 6 and 8.) The movement of driving plate 44 is transmitted through roller 55 to platen 53, causing the roller 50 to move from the upwardly offset recess 49a at the right hand end of slot 49 across the slot to the left. In the extreme right hand position, as may be seen at Fig. 3, the arcuate presser plate 54 is raised a substantial distance off the printing plate 15, but, at the beginning of movement, the guide surface quickly forces the roller 50 and connected parts downwardly until the presser plate 54 exerts considerable pressure on the printing plate 15. The contour of the guide surface of slot 49 is such that as the movement of roller 50 continues to the left, the face of the arcuate presser plate 54 rocks with strong, firm, substantially uniform pressure upon the surface of the type 16.

The end plates 54a compel the presser plate 54 to make initial contact with the printing platform at the correct point and thus prevent its starting too far to the left and being pushed back across the type by the framework to leave a smear. The end plates cooperate to confine the platen and to limit it to a rocking motion upon the type surface.

The motion of platen 53 is transmitted through roller 61 to the follow-up plate 59, moving it clockwise from its starting position shown in Fig.

3 where it is releasably held by nib 64 of dog 63 engaged in notch 62. As may be seen from Fig. 6, the movement of the follow-up plate 59 toward the left has caused the nib 64 by cam action to move out of notch 62 and to ride upon the top of the follow-up plate, putting spring 65 under increased tension.

In this manner, as cam 40 continues its rotation, the arcuate presser plate 54 of printing platen 53 is rocked farther and farther across the type 16 until the point of maximum radius on the cam is in contact with roller 42. This position is substantially as shown in Fig. 8. Meanwhile, cam 41 has been rotating in counterclockwise direction while roller 43 on the opposite arm of driving plate 44 has been rising to meet it, due to the tilting of the driving plate. At the point where the thrust of cam 40 upon roller 42 is removed, cam 41 engages roller 43 and proceeds to move the driving plate 44 and operatively connected parts in the opposite direction toward the initial position. As soon as the roller 50 reaches the upwardly offset recess 49a, the arcuate presser plate 54 is raised from the printing plate 15 and at the same time nib 64 is pulled by spring 65 into notch 62 of follow-up plate 59. It has been noted supra that the leftward tilt of the follow-up plate 59 caused nib 64 to move out of notch 62 and to ride upon the top of plate 59, thereby increasing the tension in spring 65. This increased tension has the effect of urging the follow-up plate toward its initial position, thus cooperating to restore the printing platen to its starting position. We have found that this positive pressure of tension spring 65 is effective in eliminating substantially all quiver in the printing platen and results in producing a very clear and legible impression.

It has been stated in connection with Figs. 1 and 3, that the ink ribbon 19 passes from one ribbon spool 20 down along the outside of framework 22a at one side and across the bottom thereof. From there, it goes up the other side of the device and winds upon the opposite ribbon spool. During the operation of the sales register, a sales check, or set of sales checks, is moved forward from compartment 4 (see Fig. 1) through chute 3, and over printing plate 15. The sales check and the overlying ribbon 19 are thus pressed by the rocking motion of presser plate 54 firmly against the type 16 which causes a transfer of the printing medium carried by ribbon 19 to those parts of the sales check directly over the raised type. There is considerable tension in the ink ribbon, and the lowering of the printing platen increases this tension, the ribbon bellying downward under the pressure of the descended platen. The ribbon is firmly held against the sales check at the point of contact with the rocking platen, and, when the platen is again returned to the starting position, the tension in the ribbon causes said ribbon to rise to its original position.

As the platen 53 is lifted into its initial position, cam 28 on drive shaft 14 has moved into the position shown in Fig. 4. Cam 28 now engages tappet 26 and moves slide 21 and tumbler 23 in an upward direction. The ribbon-advancing pawl 24 on the side toward which the tumbler is tilted engages with and rotates ratchet 25 on the corresponding ribbon spool 20, advancing the ribbon one step. This presents a new section of ribbon for printing with our device, and it will be noted that the ribbon is thus advanced while the printing platen is substantially in its raised initial position, thus avoiding any smearing of the printing medium on the sales check.

After cam 28 reaches and passes its highest contact point with tappet 26, the upward pressure upon the slide 21 is removed, leaving it free to return to its initial position under the combined action of gravity and of spring 27.

After our printing device has been in operation for some time, it will be understood that the continuous advance of the ribbon in one direction, as described supra, has the effect of unwinding the ink ribbon from one ribbon spool 20 and winding the same upon the other ribbon spool. When the thickness of the ribbon roll upon the spool is great enough to exercise sufficient pressure upon the adjacent arm 35 of lever 34, the ribbon advancing mechanism is automatically reversed, as described hereinabove.

Although positive printing is well known to be the most difficult kind for securing satisfactory results, we have found that our novel and improved printing device gives a sufficiently strong and firm pressure to produce very satisfactory impressions. Thus, when using our printing device, a positive type plate can be successfully employed, having the advantage of printing upon the top surface of the sales checks and permitting no direct contact between ink or carbon and the surface of the type. Thus, when the printing plate is returned to the customer, it is free from ink and/or carbon and will not soil articles with which it comes into contact. Since our ink ribbon is wound around the inner casing, just below the printing platen and in direct contact therewith during the printing operation, it will be recognized that the top sales check of a set (and other sales checks in the set, except the bottom one) must have a carbon back or must be provided with carbon paper therebelow in order to provide the impression on sales checks under the top one.

As has been mentioned herebefore, printing plates cannot be of heavy construction or the customers will refuse to carry them. Although our novel printing plate, described supra, is of sturdy construction and of sufficient strength to withstand all ordinary and normal usage, at times a printing plate may become bent or distorted through unusual circumstances. In this case, our printing device has the great advantage over prior art devices that it can employ such a bent or distorted printing plate and still produce a remarkably clear and legible impression. This is accomplished by certain novel features of our device, described hereinbefore, the operation of which will now be set forth.

Under ordinary circumstances, our vertical control plate 47 is held at the bottoms of the grooves formed by guides 48 by the combined downward pressure of gravity and the compression leaf spring 56. This spring is of sufficient strength to provide very strong and firm pressure upon the control plate and consequently, through the medium of roller 50, which is snugly held in slot 49 of the control plate, upon the printing platen. When the face of the arcuate presser plate 54 reaches a point upon a bent printing plate which is so distorted as to cause great upward pressure upon the platen, this pressure is in turn transmitted to the control plate. The control plate can move upward in response thereto by further compressing spring 56; when the upward thrust caused by the distortion is removed, the control plate and the platen are returned by the force of the spring to their normal operating positions.

It will be appreciated from the foregoing that our novel printing device provides a means capable of attachment to any standard cash register for printing upon sales checks issuing therefrom data peculiar to a particular transaction. When using our device, this information can be printed upon sales checks with a minimum of additional manual operations by the sales clerk and thus affords a means for saving considerable time and work. Our printing device requires no adjustment in operation and produces clear, uniform, legible printing without blurring or smearing. The rocking pressure produced by our printing device holds the sales check in firm position and prevents any slipping or sliding between the set of sales checks and the printing plate or between the sales checks and the ink ribbon, thereby avoiding wiping and smearing.

Although our invention has been described in connection with a preferred embodiment, it will be observed that variations and modifications can be resorted to, as those skilled in the art will understand. For example, although our invention has been described with respect to an embodiment applicable for attachment to an Ohmer class 8000 cash register, it will be realized that our invention is as readily adaptable for attachment to and/or use with any standard type of cash register and that its adaptation thereto simply involves such choice and design of mutilated and timing gears as one skilled in the art would readily make. Furthermore, while particular types of ribbon-advancing and ribbon-reversing mechanisms are described and illustrated herein, it is to be noted that other conventional mechanism can also be applied to serve these functions in our device. Similarly, although we have described a novel printing plate which we prefer to employ, other printing plates of different construction can obviously be successfully employed. In the drawings, an outer casing for our device has been omitted, but it will be appreciated that such a casing, though not necessary ordinarily, will be provided either as an integral part of the cash register casing or as a separate cover individual to the device. These, as well as other variations and modifications, are to be considered within the scope of the present specification and within the purview of the appended claims.

We claim:

1. A printing device comprising a framework, a printing platform secured in fixed relation to said framework, said platform being adapted to support a printing plate having type, a platen having an arcuate presser plate, means for slidably and rockingly mounting said platen in said framework with said presser plate positioned to exert pressure against said type, and means for causing simultaneous sliding and rocking displacement of said platen in said framework thereby to rock said presser plate progressively across said type.

2. A printing device comprising a framework, a printing platform secured in fixed relation to said framework, said platform being adapted to support a printing plate having type, a platen having an arcuate presser plate, movable means for slidably and rockingly mounting said platen in said framework with said presser plate positioned to exert pressure against said type, resilient means urging said platen toward said platform, and means for causing simultaneous sliding and rocking displacement of said platen in said framework thereby to rock said presser plate progressively across said type.

3. A printing device comprising a framework, a printing platform secured in fixed relation to said framework, said platform being adapted to support a printing plate having type, a platen having an arcuate presser plate, means for slidably and rockingly mounting said platen in said framework with said presser plate positioned to exert pressure against said type, means for causing simultaneous sliding and rocking displacement of said platen in said framework thereby to rock said presser plate progressively across said type, and means for moving said platen out of contact with said type at the end of a printing operation.

4. A printing device comprising a framework, a printing platform secured in fixed relation to said framework, said platform being adapted to support a printing plate having type, a platen having an arcuate presser plate, movable means for slidably and rockingly mounting said platen in said framework with said presser plate positioned to exert pressure against said type, resilient means urging said platen toward said platform, means for causing simultaneous sliding and rocking displacement of said platen in said framework thereby to rock said presser plate progressively across said type, and means for moving said platen out of contact with said type at the end of a printing operation.

5. A printing device comprising a framework, a printing platform secured in fixed relation to said framework, said platform being adapted to support a printing plate having type, a platen having an arcuate presser plate, movable means for slidably and rockingly mounting said platen in said framework with said presser plate positioned to exert pressure against said type, resilient means urging said platen toward said platform, means for causing simultaneous sliding and rocking displacement of said platen in said framework thereby to rock said presser plate progressively across said type, means for moving said platen to an initial position out of contact with said type at the end of a printing operation, and means for releasably latching said platen in said initial position.

6. A printing device comprising a framework, a printing platform secured in fixed relation to said framework, said platform being adapted to support a printing plate having type, a platen having an arcuate presser plate, means for slidably and rockingly mounting said platen in said framework with said presser plate positioned to exert pressure against said type, means for causing simultaneous sliding and rocking displacement of said platen in said framework thereby to rock said presser plate progressively across said type, and means for providing a printing material between said type and presser plate.

7. A printing device comprising a framework, a printing platform secured in fixed relation to said framework, said platform being adapted to support a printing plate having type, a platen having an arcuate presser plate, means for slidably and rockingly mounting said platen in said framework with said presser plate positioned to exert pressure against said type, means for causing simultaneous sliding and rocking displacement of said platen in said framework thereby to rock said presser plate progressively across said type, means for positioning an inking ribbon between said type and presser plate, and means for advancing said ribbon at the end of a printing operation.

8. A printing device comprising a framework, a printing platform secured in fixed relation to said framework, said platform being adapted to support a printing plate having type, a platen having an arcuate presser plate, means for slidably and rockingly mounting said platen in said framework with said presser plate positioned to exert pressure against said type, means for causing simultaneous sliding and rocking displacement of said platen in said framework thereby to rock said presser plate progressively across said type, means for positioning an inking ribbon between said type and presser plate, means for advancing said ribbon at the end of a printing operation, and means for reversing the direction of travel of said ribbon.

9. A printing device comprising a framework, a printing platform secured in fixed relation to said framework, said printing platform comprising means for guiding a printing plate to a printing position, means to latch said printing plate in printing position, means for releasing said latching means, means for ejecting said printing plate from said printing position, means for retaining the latch in its released position when the printing plate has been ejected, and means for applying printing pressure to said printing plate when in printing position.

10. A printing device having a printing platform comprising a table, means to hold a printing plate in printing position upon said table, means to release said holding means, means to eject said printing plate from said printing position when said holding means has been released, and means connected to the ejector means to lock the plate-holding means in its released position when the plate has been ejected.

11. A printing device having a printing platform comprising a table, guides on said table adapted to direct a printing plate to a printing position, means to hold said printing plate in printing position, means to release said holding means, means to eject said printing plate from said printing position when said holding means has been released, and means connected to the ejector means to lock the plate-holdng means in its released position when the plate has been ejected.

12. A printing device comprising in combination means for holding a printing plate, an arcuate platen adapted to cooperate with said plate, aligned arcuate ways for rockingly supporting said platen, and means for rocking said platen while displacing the same in said ways to progressively press upon successive portions of said printing plate and upon a sheet interposed between said plate and said platen.

13. A printing device comprising in combination means for holding a printing plate, an arcuate platen adapted to cooperate with said plate, means for rockingly supporting said platen, aligned arcuate ways for said supporting means, and means for rocking said platen while displacing the said supporting means in said ways thereby progressively to apply printing pressure upon a sheet interposed between said plate and said platen.

14. A printing device comprising in combination a printing platform for holding a printing plate, an arcuate platen adapted to cooperate with said plate, means for rockingly supporting said platen, aligned arcuate ways for displaceably holding said supporting means, and means for reciprocably rocking said platen in said supporting means and simultaneously displacing said supporting means in said ways thereby to apply printing pressure upon successive portions of a sheet interposed between said plate and said platen, said ways having a portion for guiding the platen into an inoperative position to permit introduction and withdrawal of sheets.

15. In a machine of the class described, a printing device comprising in combination a frame, a control plate having a guide surface mounted in said frame, a printing platen having an arcuate presser plate rockingly and slideably mounted in said guide surface, a printing platform below said presser plate and adapted to hold a printing plate in cooperative position with the presser plate, and means for causing simultaneous rocking and sliding displacement of said platen with respect to said control plate thereby to apply printing pressure to successive portions of a sheet interposed between said printing and presser plates.

16. In a machine of the class described, a printing device comprising in combination a frame, a control plate having a guide slot therein mounted in said frame, a printing platen having an arcuate presser plate slideably and rockingly mounted in said slot, a printing platform below said presser plate adapted to hold a printing plate in cooperating position with the presser plate, a driving plate pivotally mounted in said frame and operatively connected with said platen, and means operable upon actuation of said machine to oscillate said driving plate and to cause simultaneous rocking and sliding displacement of said platen with respect to the slot of said control plate whereby printing pressure is uniformly and progressively applied to successive portions of a copy sheet and a transfer web interposed between said printing and presser plates.

17. In a machine of the class described, a printing device comprising in combination a frame, a control plate having a guide slot mounted for vertical displacement in said frame, a printing platen having a curvilinear presser plate slideably and rockingly mounted in said slot, a printing platform below said presser plate adapted to hold a printing plate in cooperating position with the presser plate, a driving plate pivotally mounted in said frame and operatively connected with said platen, means operable upon actuation of said machine to oscillate said driving plate and to cause simultaneous rocking and sliding displacement of said platen in the slot of said control plate whereby printing pressure is uniformly and progressively applied to successive portions of a copy sheet and an inking ribbon interposed between said printing and presser plates, and resilient means urging said control plate toward the printing platform to maintain said printing pressure substantially constant.

18. In a machine of the class described, a printing device comprising in combination a frame, a control plate having a guide slot with an upwardly offset recess mounted for vertical movement in said frame, a printing platen having a curvilinear presser plate slideably and rockingly mounted in said slot, a printing platform below said presser plate adapted to hold a printing plate in cooperating position with the presser plate, a driving plate pivotally mounted in said frame and operatively connected with said platen, means operable upon actuation of said machine to oscillate said driving plate and to cause simultaneous rocking and sliding displacement of said platen in the slot of said control plate whereby printing pressure is uniformly applied to successive portions of a copy sheet and an inking ribbon interposed between said printing and presser plates, resilient means urging said control plate toward the printing platform to maintain said printing pressure substantially constant, and means for raising the pivotably mounted part of said printing platen into said offset recess of the control plate for withdrawing the printing platen from contact with said printing plate to permit introduction and removal of copy sheets.

19. In a machine of the class described, a printing device printing upon sales checks and the like data peculiar to a particular transaction which comprises a framework, a control plate having a guide slot mounted therein, a printing platen having an arcuate presser plate slideably and rockingly mounted in said guide slot, a printing platform below the arcuate presser plate of the platen adapted to hold in fixed position thereupon a printing plate bearing type setting forth data peculiar to a particular transaction, a driving plate pivotally mounted in said framework and operatively connected with said platen, means operable upon actuation of said machine to oscillate said driving plate and to cause simultaneous rocking and sliding displacement of said platen in the slot of said control plate whereby printing pressure is uniformly applied to successive portions of a sales check and an inking ribbon interposed between said printing and presser plates, and means for releasably latching said platen in an initial position in which said presser and printing plates are separated from each other.

20. In a machine of the class described, a printing device printing upon sales checks and the like data peculiar to a particular transaction which comprises a framework, a control plate having a guide slot mounted therein, a printing platen having an arcuate presser plate slideably and rockingly mounted in said guide slot, a printing platform below the arcuate presser plate of the platen adapted to hold in fixed position thereupon a printing plate bearing type setting forth data peculiar to a particular transaction, a driving plate pivotally mounted in said framework and operatively connected with said platen, means operable upon actuation of said machine to oscillate said driving plate and to cause simultaneous rocking and sliding displacement of said platen in the slot of said control plate whereby printing pressure is uniformly applied to successive portions of a sales check and an inking ribbon interposed between said printing and presser plates, means comprising a follow-up plate pivotally mounted upon the framework having operative engagement with the printing platen for releasably holding the platen in an initial position, and resilient means for urging the follow-up plate toward such initial position.

RONALD J. HARRINGTON.
FRANKLIN P. SHEARER.